United States Patent [19]
Nitkin

[11] Patent Number: 4,850,306
[45] Date of Patent: Jul. 25, 1989

[54] AUXILIARY CAGE

[76] Inventor: Ross A. Nitkin, 27 Stearns Rd., Brookline, Mass. 02146

[21] Appl. No.: 214,164

[22] Filed: Jul. 5, 1988

[51] Int. Cl.⁴ .............................................. A10K 31/00
[52] U.S. Cl. ......................................... 119/15; 119/17
[58] Field of Search ........................ 119/15, 17, 19, 29

[56] References Cited

U.S. PATENT DOCUMENTS

| | | | |
|---|---|---|---|
| 3,774,576 | 11/1973 | Moore | 119/17 |
| 4,480,587 | 11/1984 | Sedlacek | 119/17 |
| 4,677,938 | 7/1987 | Tomminaga | 119/15 |

FOREIGN PATENT DOCUMENTS

| | | | |
|---|---|---|---|
| 387456 | 2/1933 | United Kingdom | 119/17 |
| 791000 | 2/1950 | United Kingdom | 119/17 |
| 2148087 | 5/1985 | United Kingdom | 119/15 |

Primary Examiner—John Weiss

[57] ABSTRACT

An auxiliary cage for positioning on an animal tank such cage having a generally closed rectangular structure disposed above the open top of the animal tank with a suspended floor structure positioned within the tank with openings in such suspended floor and in the bottom of the closed cage structure and a ramp extending from the bottom of the tank to the suspended floor opening and a further ramp extending from the suspended floor to the opening in the bottom of the cage structure on top of the tank.

4 Claims, 1 Drawing Sheet

AUXILIARY CAGE

BACKGROUND OF THE INVENTION

1. Field of the Invention

The device of this invention resides in the area of animal cages and more particularly relates to an auxiliary cage used in combination with glass rectangular animal tanks to increase the floor space therein.

2. Description of the Prior Art

Small pets such as gerbils, hamsters and mice are frequently kept in cages such as 10-gallon tanks typically having four glass sides with a screen member placed thereover. In such cages an animal can walk along the bottom thereof and exercise devices such as wheels and other toys are often provided to allow the small animal means to exercise since there is such a small amount of space on the tank bottom for them to walk upon. Some manufacturers of pet products offer small-animal containment units tank systems with series of interconnecting tubes for an animal to run through for both the entertainment of its owner and for exercise of such animal.

SUMMARY OF THE INVENTION

It is an object of this invention to provide an auxiliary cage that can be used in combination with a typical 10-gallon tank to provide increased floor space for a small animal to walk upon to both increase the amount of exercise for the animal and to provide entertainment for its owner in watching his pet climb to the different levels of the structure of this invention.

The device of this invention includes a rectangular auxiliary cage support structure having its floor being approximately a little larger than the length and wideth of the upper rim of the tank, such auxiliary cage support structure adapted to be placed over such tank rim in a way so as to block all space between the auxiliary cage support structure and the tank's rim. The auxiliary cage support structure can be made of wire mesh such as hardware wire which has approximately ½ inch square openings in the mesh and is made of heavy metal wire. The auxiliary cage support structure can have a height sufficient to allow a small animal to walk between the floor and the top of the auxiliary cage support structure. Such height can fall in the 3"–6" range. In a portion of the open mesh wire floor of the auxiliary cage support structure is a second floor aperture and extending down from a side of this aperture is a second floor ramp. Suspended from the auxiliary cage support structure at its corners are four chain members of adjustable length which are attached at their bottoms and suspend a lower first floor member approximately midway in height between the top and bottom of the tank. This first floor member can also be constructed of wire mesh and has a first floor aperture also of a size to allow passage of a small animal therethrough with a first floor ramp extending downward therefrom to the bottom of the tank. The second floor ramp extends from the bottom of the auxiliary cage support structure to the suspended first floor and the first floor ramp extends from the suspended first floor to the tank's bottom so that a small animal can walk from the tank's bottom, up the first floor ramp, around on the suspended first floor and then up the second floor ramp through the second floor aperture to walk around on the second floor being the base of the auxiliary cage support structure positioned on top of the tank. By installing the device of this invention, the floor space available to the small animal contained within the tank can be effectively tripled without modifying the existing tank.

DESCRIPTION OF THE PREFERRED EMBODIMENT(S)

Figure 1:
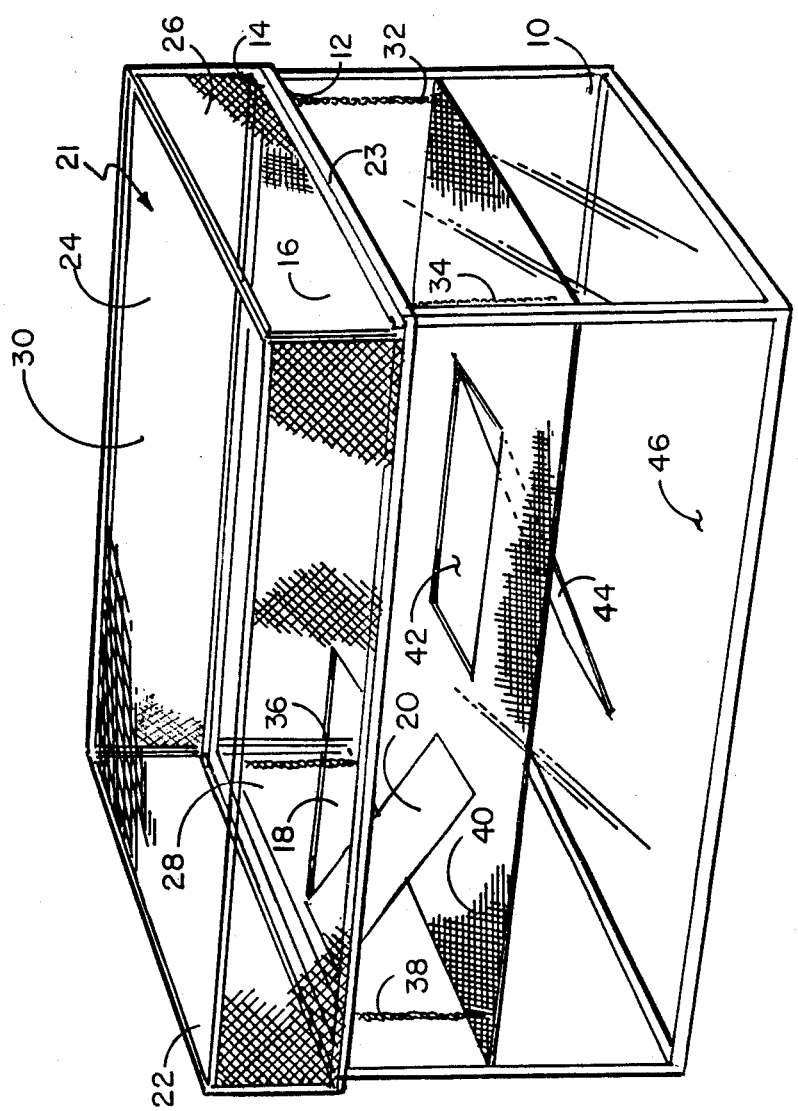
FIG. 1 illustrates a perspective view of the device of this invention in place in a tank.

FIG. 1 illustrates the structure of this invention installed in a tank of the type having four glass sides and most typically being a 10-gallon aquarium-type tank that is commonly used to contain small animals. The device of this invention can be made larger or smaller or accommodate larger or smaller tanks such as 5-gallon tanks, 20-gallon tanks and the like. The structure of this invention includes an auxiliary cage support structure 21 which is of a size to cover over the top of tank 10. Floor 16 of auxiliary cage support structure 21 can include an auxiliary cage support member 14 which is a solid member around its edges adapted to rest upon the tank's upper rim 12. Floor 16 of the auxiliary cage support structure is also referred to as the second floor of the device of this invention. The auxiliary cage support 14 can include an outer lip 23 that extends downward along the outside of tank 10 or equivalent retention means to retain the auxiliary cage support structure securely on top of tank 10 so that it will not accidently slide off. The auxiliary cage support structure can be made of an open wire mesh such as hardware wire or equivalent which can have a ½ inch rectangular opening between the wires of the mesh and can be constructed in a rectangular fashion with a first side 26, a second side 30, a third side 22 and a fourth side 28, all extending upwards from floor 16 at auxiliary cage support member 14, and all joined at their ends and aligned approximately with the sides of tank 10. Top 24 of the auxiliary cage support structure 21 is attached over the top of the four sides 26, 30, 32 and 28; and floor 16 is attached at the bottom of these sides extending from auxiliary cage support member 14 so as to form a substantially closed rectangular cage of a length and width approximating that of the tank on which it is fitted. Sides 26, 30, 22 and 28, top 24, and floor 16 can be welded together to form a rectangular structure or affixed together by other equivalent means. Within the floor 16 of auxiliary cage support structure 21 is formed second floor aperture 18 of a size to allow passage therethrough of a small animal, such size being approximately 3"×3". Attached to floor 16 adjacent to second floor aperture 18 is second floor ramp 20 which can be made of the same wire mesh material as the auxiliary cage support structure or composed of other suitable material and is adapted to extend downward from floor 16. Also attached to floor 16 at the auxiliary cage support member area are suspension members 32, 34, 36 and 38 which can be small chains or equivalent. Attached to the bottom of these suspension members and suspended midway between the top and bottom of tank 10 is first floor 40. First floor 40 can also be made of similar open wire mesh and extends substantially across the entire length and width of the inside of tank 10. The positioning of first floor 40 can be adjusted by adding or removing links from the chains that suspend it within tank 10. Within first floor 40 is formed a first floor aperture 42 being also approximately 3"×3"

in size and first floor ramp 44 extends down to tank bottom 46. Second floor ramp 20 extends down from the second floor 16 and rests upon first floor 40.

The device of this invention allows a small animal to walk over the area of tank bottom 46 and when it desires, to walkup first floor ramp 44 through first floor aperture 42. The animal can then walk around first floor 40 suspended at approximately the mid-level of tank 10. The animal then can, if it desires, walk up second floor ramp 20 through second floor aperture 18 and walk around on second floor 16 without the owner fearing that the animal may escape since it is contained within auxiliary cage support structure 21.

To clean the tank or replenish food supplies, one merely lifts up the auxiliary cage support structure which will, in turn, lift suspension members 32, 34, 36 and 38 attached to first floor 40 out of tank 10 allowing access to the tank bottom for such cleaning and replacement of food. The structure of this invention, being substantially made of mesh material, can be easily cleaned by spraying water thereon and easily reinstalled onto the tank, suspending the first floor therein. Since some water bottles rest against an inner side of a tank, an area in the first floor against a side of the tank where such water bottle is to be positioned can be cut out to allow the positioning of such water bottle. Upon reinstallation of the auxiliary cage support structure and suspended first floor, the first floor water bottle aperture can be fitted around such bottle.

Although the present invention has been described with reference to particular embodiments, it will be apparent to those skilled in the art that variations and modifications can be substituted therefor without departing from the principles and spirit of the invention.

I claim:

1. An auxiliary cage to be utilized with a small animal tank of the type having rectangular glass sides, an open top, a bottom and an upper tank rim, comprising:
   an auxiliary cage support structure having a floor therein disposed above the open top of said tank, said floor including an auxiliary cage support member adapted to rest upon said upper tank rim, such auxiliary cage support structure further including first, second, third and fourth sides, each having a top, bottom and first and second ends, said ends joined together with said sides extending upwards parallel to the sides of said tank to form a rectangular structure;
   a top member affixed to the top of said sides forming an enclosed cage structure positioned on top of said tank, extending upwards a distance sufficient to allow a small animal to walk on said floor;
   a first floor structure of a size substantially that of the interior length and width of said tank;
   suspension means extending from the bottom of said auxiliary cage support structure suspending said first floor between the top and bottom of said tank;
   a first aperture of sufficient size to allow passage of a small animal therethrough defined within said first floor;
   a first floor ramp extending from said first floor at a side of said first floor aperture down to said tank bottom;
   an aperture defined in the floor of said auxiliary cage support structure of sufficient size to allow passage of a small animal therethrough; and
   a floor ramp extending from a portion of the floor of said auxiliary cage support structure at a side of said auxiliary cage support structure aperture, said floor ramp extending down to said suspended first floor.

2. The device of claim 1 wherein said auxiliary cage support structure, suspended first floor and ramps are constructed of open mesh material.

3. The device of claim 2 wherein said mesh material is wire mesh.

4. The device of claim 1 wherein said suspension means comprise first, second, third and fourth chain members, each suspended from a corner of the floor of said auxiliary cage support structure and attached to the corners of said first floor, such chains including means to lengthen and shorten them as desired.

* * * * *